United States Patent [19]
Sonetaka et al.

[11] 3,874,277
[45] Apr. 1, 1975

[54] APPARATUS FOR PREPARING MINERAL WATER

[75] Inventors: Kazunori Sonetaka; Atsushi Nishino; Hiroshi Kumano, all of Osaka, Japan

[73] Assignee: Matsushita Electric Industrial Company, Osaka, Japan

[22] Filed: June 27, 1973

[21] Appl. No.: 374,125

[30] Foreign Application Priority Data
June 28, 1972 Japan................ 47-65255
June 18, 1972 Japan................ 47-65256
June 18, 1972 Japan................ 47-65257
June 28, 1972 Japan................ 47-56258
July 12, 1972 Japan................ 47-70124
July 12, 1972 Japan................ 47-70125
Aug. 2, 1972 Japan................ 47-77906

[52] U.S. Cl. .................................... 99/323.1
[51] Int. Cl............................................ A23i 1/00
[58] Field of Search............ 99/323.1, 323.2, 323.3, 99/467, 473, 474, 475, 275

[56] References Cited
UNITED STATES PATENTS
| | | | |
|---|---|---|---|
| 2,462,019 | 2/1949 | Bowman | 99/275 |
| 2,566,436 | 9/1951 | Waite | 99/275 |
| 3,256,802 | 6/1966 | Karr | 99/275 |
| 3,472,425 | 10/1969 | Booth | 99/275 |
| 3,761,066 | 9/1973 | Wheeler | 99/323.1 |

*Primary Examiner*—Robert W. Jenkins

[57] ABSTRACT

Apparatus for converting service water into temperarily hard mineral water similar to natural mineral water. The apparatus comprises an aerator which carbonates uncarbonated water such as service water and a mineral dissolver containing minerals soluble into the carbonated water.

12 Claims, 8 Drawing Figures

APPARATUS FOR PREPARING MINERAL WATER

This invention relates generally to apparatus for producing mineral water, and particularly to apparatus for converting service water into temporarily hard mineral water.

Mineral water has conventionally been obtained by dissolving water-soluble salts such as calcium dihydrogen phosphate ($Ca(H_2PO_4)_2.H_2O$), magnesium sulfate ($MgSO_4.7H_2O$), sodium chloride (NaCl), calcium chloride ($CaCl_2.2H_2O$), magnesium chloride ($MgCl_2.6H_2O$) and sodium hydrogen carbonate ($NaHClO_3$) into service water in order to increase its mineral content.

Although this prior art method is useful for mass production, it is not useful for small quantity production as required in household applications. Another disadvantage is that mineral water prepared by merely dissolving water-soluble salts into service water is permanently hard and contains anions unfavorable for the human body such as $SO_4^{--}$, $Cl^-$ and $PO_4^{---}$, while natural mineral water is temporarily hard and does not contain such anions. Since the stoichiometrical amount of these anions increases by an amount equal to the amount of salts dissolved into the water, the obtained mineral water is essentially different from natural mineral water.

It is accordingly an object of the present invention to provide an apparatus for preparing temporarily hard mineral water similar to natural mineral water.

Another object of the invention is to provide an apparatus wherein an aerator is provided to turn service water into carbonated water prior to a step for increasing the dissolved mineral content.

A further object of the invention is to provide an improved aerator which efficiently maintains the content of dissolved carbon dioxide gas at a desired value.

Still another object of the invention is to provide an improved mineral dissolver which provides clear temporarily hard mineral water in an efficient manner.

These and other objects, advantages and features of the present invention will be better understood from the following description taken in conjunction with the accompanying drawings, in which:

FIG. 6b is a fragmentary enlarged cross-sectional view of the filter element of the filter assembly of FIG. 6a; and FIG. 6c is a partly cut-away perspective view of another form of the filter element of FIG. 6a.

In brief, the present invention contemplates the use of an aerator to carbonate water containing no minerals prior to dissolving minerals into the water. The carbonated water permits minerals such as calcium carbonate to be dissolved thereinto to provide temporarily hard mineral water containing hydrogen carbonic or bicarbonic ions. In accordance with the present invention, there is provided a mineral water converting system which comprises a filter to remove objectionable particles, a mineral dissolver and an aerator interposed therebetween which may be of a conventional type. In a preferred embodiment of the invention, the aerator is provided with a spring-biased diaphram and a valve operatively connected therewith to cooperatively maintain carbon dioxide gas at a predetermined pressure level. The aerator is also provided with a similar spring-biased diaphragm and a throttle valve operatively connected therewith to cooperatively maintain the supplied water at a predetermined pressure level. Upon introduction of water into the aerator, the spring-biased diaphragm is caused to move upwardly to raise the throttle valve in such a way as to admit the gas maintained at the predetermined pressure level into a mixing chamber which is situated directly below the diaphragm. These spring-biased diaphragm arrangements thus control the amount of carbon dioxide mixed with water at a predetermined value. In a still another preferred embodiment of the invention, the flow rate of the carbonated water through the mineral dissolver may be varied to accordingly vary the contents of dissolved minerals and carbonic acid as well as the pH value.

Figure 1:
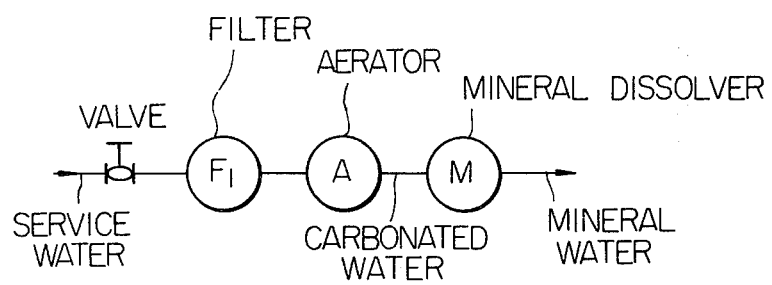
FIGS. 1 through 3 are flow diagrams showing embodiments of a mineral water producing apparatus in accordance with the present invention.
Figure 2:
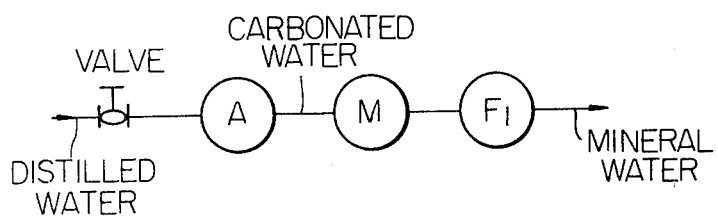
Figure 3:
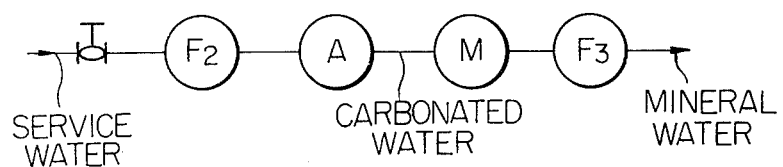

Reference is now made to FIGS. 1 through 3 wherein flow diagrams illustrate a mineral water converting system in accordance with the present invention in modified forms. In FIG. 1, a first form of the mineral water converting system is shown and comprises a valve provided at the inlet end of the system for introduction of plain water such as service water into the system, a filter $F_1$ to remove objectionable solid particles and sterilizing agents contained in the water, an aerator (A) connected with the outlet of the filter $F_1$ to carbonate the water and a mineral dissolver (M) connected to the outlet of the aerator to allow the carbonated water to pass therethrough. The dissolver comprises one or more of cartridges containing minerals such as calcium carbonate ($CaCO_3$). As the water passes through the cartridge the calcium carbonate is dissolved into the water and the following chemical reaction takes place:

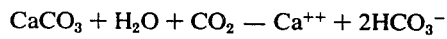

$$CaCO_3 + H_2O + CO_2 \rightarrow Ca^{++} + 2HCO_3^-$$

The hydrogen carbonic ions ($HCO_3^-$) are found also in naturally occurring mineral water. Therefore, the mineral water thus obtained in accordance with the present invention does not contain objectionable anions such as $SO_4^{--}$, $Cl^-$ and $PO_4^{---}$. If pure water such as distilled water is used instead of service water, the filter $F_1$ is dispensed with.

A preferred form of the embodiment is shown in FIG. 2 which differs from FIG. 1 in that the filter $F_1$ is provided at the outlet of the mineral dissolver. In this arrangement sterilizing agents are removed at the last stage of the system (if service water is used). Because sterilizing agents are allowed to pass through the system, corrosion which might otherwise occur in the various parts of the system may be prevented. A still another preferred form of the embodiment is shown in FIG. 3 in which a filter $F_2$ is provided at the inlet of the system to remove only solid particles or objects and a filter $F_3$ provided at the outlet of the system is to remove sterilizing agents.

Figure 4:
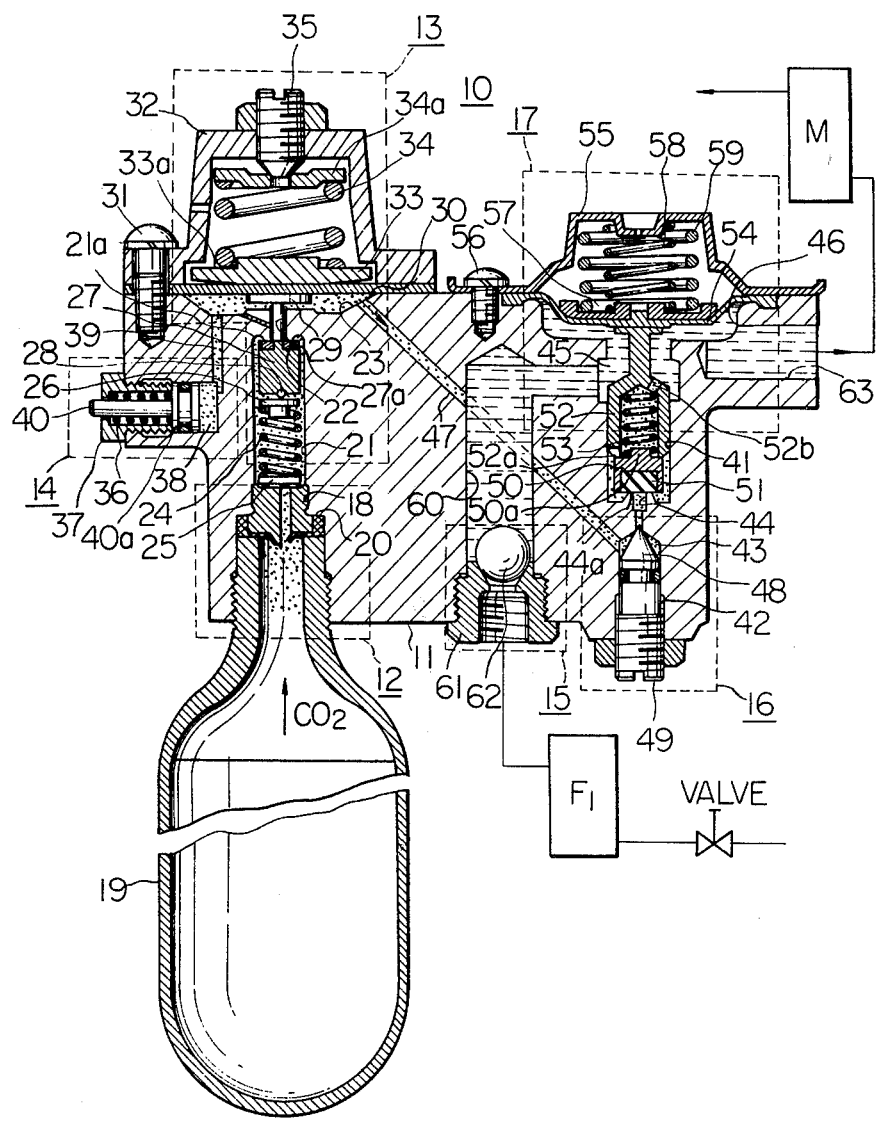
FIG. 4 is a cross-sectional view of an aerator employed in the practice of the present invention.

Reference is now made to FIG. 4 in which an aerator in accordance with a preferred form of the invention is shown. The aerator of FIG. 4 shown at 10 includes a body 11 which is provided with a gas inlet portion 12, a gas decompressor portion 13, a gas pressure indicator portion 14, a water inlet portion 15 and a mixing portion 17. the body has a bore 18 on the left-hand side of its bottom into which a gas reservoir or bomb 19 is fitted. The bore 18 is symmetrical about its longitudinal axis and is stepped to provide axially successive bore portions of varying cross sectional areas with shoulders formed between said bore portions. These bore portions and shoulders include a bore portion 19, an annular radial shoulder 20, a bore portion 21, a shoulder 21a, a bore portion 22 and a tapered opened bore portion 23. A filter 25 is disposed at the inlet end portion of the bore 21. A coil spring 24 is carried on the filter 25. A spring shoe 26 is carried on the upper end of the spring 24 with a ball 28 fitted thereon. A valve 27 is provided in the bore 21 with a cross-sectionally V-shaped recess fitted over the ball 28 for axially reciprocating movement with the spring 24. The valve 27 has on its upper end an annular recess which is filled with a packing 27a. The packing 27a is positioned directly below a shoulder portion 29a. A cross sectionally T-shaped circular member 29 is provided in the bore portions 22 and 23 and carried on the valve 27 for axially reciprocating movement therewith. The tapered open-end bore portion or chamber 23 is closed by a flexible member or diaphragm 30 which is fixed to the body 11 by a screw 31 abutting the T-shaped member 29 to transmit the urging force of a spring 34 thereto. A housing 32 is provided over the diaphragm 30 and fixedly connected to the body 11 by the screw 31. A spring shoe 33 is carried on the diaphragm 30 and has an annular recess 33a therein. The coil spring 34 rests on the annular recess 33a. A spring shoe 34a is carried on the spring 34. A screw 35 is threaded through the upper wall of the housing 32 and extends inwardly to engage an aperture (no numeral) provided on the spring shoe 34a to apply a downward pressure onto the diaphragm 30 by adjustment of the screw 35. The pressure indicator 14 comprises a coil spring 36 carried in the fitting 37 threaded horizontally into a bore 38. the bore 38 communicates with the bore portion 23 through a passage 39. A rod 40 is received by the spring 36 to indicate the pressure level within the bore 38 which overcomes the biasing action of the spring 36 via a sealing member 40a which sealingly engages the wall of the bore 38.

The body 11 has a bore 41 at the right-hand side thereof. Similar to the bore 18, the bore 41 is symmetrical about its longitudinal axis and is of stepped diameter to provide axially successive bore portions of varying cross-sectional areas with a shoulder formed between said bore portions. These bore portions and shoulders include a bore portion 42, a shoulder 43, a bore portion 44, a bore portion 45 and a bore portion 46. The body 11 is provided with a passage 47 which provides communication between the bore portions 23 and 43. A needle valve 48 is carried within the bore portion 42 on a screw 49 threaded through the bore 42. An automatic valve 50 has a packing 51 fitted into a recess provided on the lower end thereof and is carried on an annular projection 44a. A throttle valve 52 has its open end cylinder portion extending downwardly to rest on the valve 50 and has its upward rod portion extending through the bore portion 45 into the bore portion 46. A coil spring 53 is received at its lower end by an upper protrusion of the valve 50 and carried in the cylinder portion of the throttle valve 52 for axial reciprocating movement with the valve 52. The open-end bore portion 46 is closed by a flexible member or diaphragm 54 fixed to the body 11 by a housing 55 through a screw 56. In the housing 55 there is provided a spring shoe 57 carrying a coil spring 58 and a coil spring 59 larger in diameter than the coil spring 58. The upper end of the spring 58 engages the upper end wall of the housing 55 to apply a downward pressure to the diaphragm 54. The spring 59 has its upper end spaced from the upper end wall of the housing to apply a downward pressure when the diaphragm is moved upwardly to an extent that the upper end of the spring 59 is brought into contact with the housing. The throttle valve 52 has at its lower portion an opening 52a and at its shoulder portion an opening 52b. The diaphragm 54 is urged downwardly by the springs 58 and/or 59 to apply a predetermined pressure onto the rod portion of the throttle valve 52.

The body 11 is further provided with a bore 60 which provides communication between an inlet portion 15 and the bore portion 45 to serve as an inlet passageway for the water to be carbonated. The inlet portion 15 has a check valve which comprises a valve seat 61 having an opening facing outwardly and a tapered opening (no numeral) on the inner side thereof in coaxial alignment therewith. A ball 62 is received into the tapered opening of the valve seat 61. The body 11 has an opening 63 for delivery of the carbonated water to the mineral dissolver.

The gas bomb 19 carries a quantity of liquid carbon dioxide which, when the bomb is opened, is vaporized at the ambient temperature to provide a high pressure gas. The gas pressure in the bomb usually ranges from 50 to 100 kg/cm$^2$ depending on the ambient temperature.

Upon insertion of the gas bomb 19 into the inlet portion 12 of the body 11, a sealed end portion (no numeral) of the bomb 19 is ruptured to admit the highly pressurized gas into the bore 21. Because of its high pressure, the gas advances and finds its way into the bore 22, overcoming the pressure acted upon by the spring 24, and into the bore 23. The gas pressure has thus been reduced by the spring action of the spring 24 to a pressure ranging from about 5 to 10 kg/cm$^2$ in the bore 23. The carbon dioxide gas continues to advance through the passage 47 to the interspace between the wall of the bore portion 42 and the needle valve 48. The amount of gas admitted into the bore portion 44 is controlled by adjustment of the screw 49. In this instance, the gas flow into the bore portion 41 is prevented by the automatic valve 50 which applies downward pressure by the spring action of the spring 58 disposed in the housing 55.

When the intake valve is opened to admit service water into the system and after passing through the filter, the water is admitted through the inlet 15 and past the check valve ball 62 into the bore 60 and fills the bore portions 45 and 46. As the water fills the bore portion 46, it applies an upward pressure on the diaphragm member 54 and raises it to a level to admit the gas in the bore portion 44 to flow into the bore portion 41 and through the openings 52a and 52b into the bore portion 45. The gas is dissolved into the water to turn it into carbonated water. The springs 58 and 59 are for the purpose of controlling the water pressure in the bore 45 at a predetermined level, since service water has a different water pressure depending on the location where it is served. With these arrangements, both the gas pressure and the water pressure are controlled and maintained at predetermined values and thus the obtained carbonated water has a desired amount of carbon dioxide. If the carbonated water is incidentally fed back, the throttle valve 52 is caused to fall on the annular projection 44a to prevent its passage into the bore portion 44. Finally, the carbonated water is delivered through the opening 63 and led to the mineral dissolver.

Figure 5:
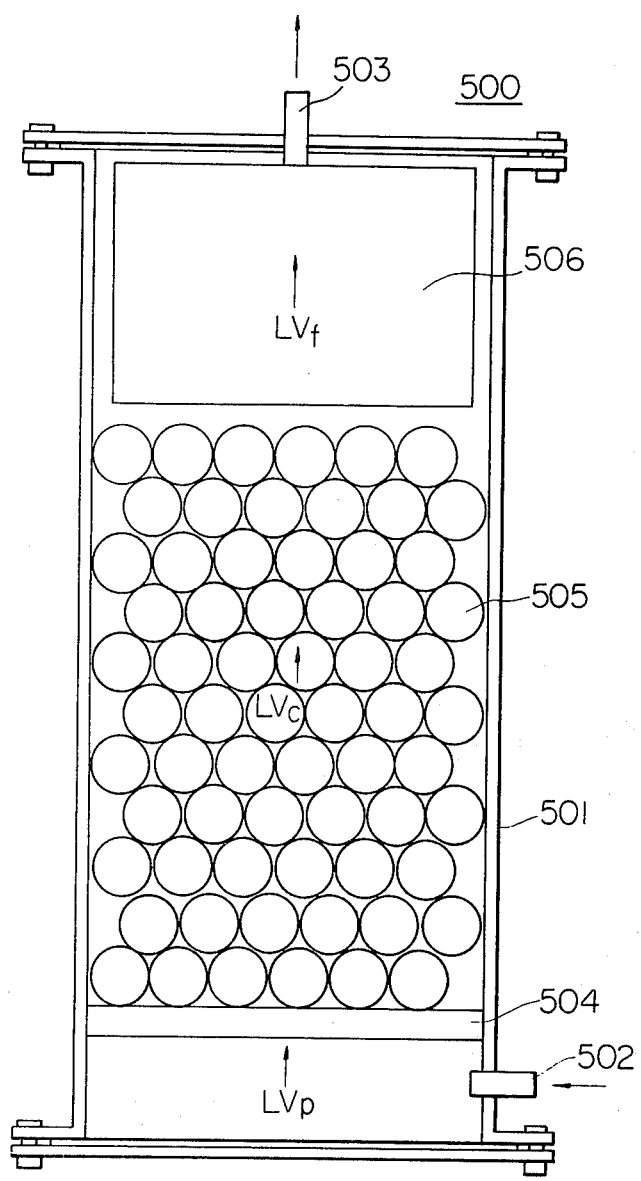
FIg. 5 is a cross-sectional view in elevation of a mineral dissolver in accordance with the present invention.

In a preferred embodiment of the invention, a mineral dissolver is shown indicated in FIG. 5 at numeral 500 and comprises a housing 501 provided with an inlet 502 in the wall thereof adjacent to the bottom thereof and an outlet 503 on the lid thereof. A porous filter 504 is carried in the housing adjacent to and downstream of the inlet 502. Minerals, preferably calcium carbonate, in the form of granule 505 are packed in the housing at a desired density with interstices therebetween and carried on the porous filter 504. On the upper portion of the housing 501 there is provided a plurality of filter cloth layers 506 interposed between the outlet 503 and the minerals 505. Carbonated water from the aerator 10 of FIG. 4 is led into the housing 501 through the inlet 502. As the water flows into the housing 501, it rises upwardly and when it reached the filter 504 it gently passes through the microscopic interstices of the layers 505. In the layer 505 the carbonated water is uniformly distributed to increase solubility of the minerals into the water. As the water passes through the interstices of the mineral layers 505 it dissolves the minerals into the water. The mineral-containing water is let out through the outlet 503 to service stations (not shown). Assume that the space velocity (SV) of the carbonated water through the mineral dissolver 500 is defined by the following equation:

$$\frac{Q \text{ cm}^3/\text{min}}{V \text{ cm}^3} = SV \text{ (min}^{-1})$$

where $Q$ is the flow rate of carbonated water through the interstices between the minerals 505, and $V$ is the volume of the packed minerals measured when the mineral is under dried condition. Experiments were made to determine the relationship between the space velocity and the amount of mineral contents. The experiments have shown that increased space velocity increases the amount in the total acid contained in the water which means that the water is highly carbonated. With the space velocity of up to about 20 min$^{-1}$ in powdered calcium carbonate, a total acid content of about 35 to 890 ppm and a hardness ranging from 70 to 90 ppm can be obtained. With the space velocity of up to 20 min$^{-1}$ in crushed calcium carbonate, a total acid content of from about 60 to about 585 ppm and a hardness of from 70 to 800 ppm can be obtained. For granulated calcium carbonate with a space velocity of from 2 to 40 min$^{-1}$, a total acid of from about 20 to about 825 ppm and a hardness of from 76 to 90 ppm can be obtained. Preferable ranges of the space velocity (SV) making mineral water for drinking purposes are from 0.5 to 5 min$^{-1}$ in powdered or granulated calcium carbonate and from 0.1 to 2 min$^{-1}$ in crushed calcium carbonate.

EXPERIMENT I

Run 1

Powdered calcium carbonate was used as a mineral and the space velocity was varied in the range from 2 to 20 cm/min. The following Table shows the results obtained.

Table 1

| | V cm³ | Q cm³/min | SV min⁻¹ | Raw water Hardness ppm | pH | Total acid ppm |
|---|---|---|---|---|---|---|
| 1 | 1000 | 2000 | 2 | 46.0 | 6.80 | 10.0 |
| 2 | 200 | 2000 | 10 | 40.0 | 6.65 | 12.0 |
| 3 | 200 | 4000 | 20 | 40.0 | 6.85 | 8.0 |

| Mineral water Hardness ppm | pH | Total acid ppm |
|---|---|---|
| 90.0 | 6.50 | 35.0 |
| 80.0 | 5.65 | 342.0 |
| 70.0 | 5.05 | 886.0 |

Run 2

Crushed calcium carbonate was used and the space velocity was varied in the range from 2 to 15 min$^{-1}$.

Table 2

| | V cm³ | Q cm³/min | SV min⁻¹ | Raw water Hardness ppm | pH | Total acid ppm |
|---|---|---|---|---|---|---|
| 1 | 1000 | 2000 | 2 | 48.0 | 6.80 | 10.0 |
| 2 | 400 | 2000 | 5 | 40.0 | 6.65 | 12.0 |
| 3 | 200 | 3000 | 15 | 40.0 | 6.85 | 8.0 |

| Mineral water Hardness ppm | pH | Total acid ppm |
|---|---|---|
| 80.0 | 6.25 | 62.0 |
| 76.0 | 5.85 | 186.0 |
| 70.0 | 5.20 | 582.0 |

Run 3

Granulated calcium carbonate was used and the space velocity was varied in the range from 2 to 40 min$^{-1}$.

Table 3

| | V cm³ | Q cm³/min | SV min⁻¹ | Raw water Hardness ppm | pH | Total acid ppm |
|---|---|---|---|---|---|---|
| 1 | 1000 | 2000 | 2 | 40.0 | 6.65 | 11.0 |
| 2 | 200 | 2000 | 10 | 42.0 | 6.75 | 10.0 |
| 3 | 100 | 4000 | 40 | 40.0 | 6.80 | 8.0 |

| Mineral water Hardness ppm | pH | Total acid ppm |
|---|---|---|
| 90.0 | 6.50 | 22.0 |
| 84.0 | 6.05 | 166.0 |
| 76.0 | 5.20 | 822.0 |

In accordance with another feature of the present invention, supply water is arranged to flow at different linear velocity (LV) as defined by the following equation to determine water clearness, the amount of remaining $CO_2$ after reaction with $CaCO_3$ and the water hardness:

$$LV \text{ (cm/min)} = \frac{Q \text{ cm}^3/\text{min}}{S \text{ cm}^2}$$

Where $Q$ is the flow rate of water passing through the mineral dissolver 500 and $S$ is the cross-sectional area of the housing 501. Linear flow rates measured at various points of the dissolver are $LV_f$ which is the linear velocity at the filter cloth layers 506, $LV_p$ the linear velocity at the porous filter 504, and $LV_c$ at the interstices between the calcium carbonate particles 505. With regard to these linear velocities the following experiments are made:

EXPERIMENT II

Run 1

Carbonated water was supplied at various linear velocities through a dissolver 500 having different diameters. Good clearness of water was obtained when the value of $LV_f$ was up to 50 cm/min without appreciable blockage of the water due to the calcium carbonate unsolved and accumulated in the filter cloth.

Table 4

| Q cm³/min | S cm² | LV$_f$ cm/min | Clearness | Blockage |
|---|---|---|---|---|
| 2000 | 500 | 4 | clear | little |
| 4000 | 100 | 40 | '' | '' |
| 8000 | 40 | 200 | '' | some |
| 500 | 2000 | 0.25 | '' | little |
| 6000 | 10 | 600 | turbid | much |

Run 2

Carbonated water was supplied at various linear velocities through the dissolver 500 having different diameters to determine the amount of the remaining carbon dioxide into the water after the reaction with $CaCO_3$. The amount of the remaining dissolved carbon dioxide in this specification is determined as a ratio between the initial amount of the carbon dioxide dissolved into the water in the aerator and the amount of the remaining dissolved carbon dioxide after passing through the mineral dissolver 500. The linear velocity $LV_p$ is preferably up to 100 cm/min without appreciable blockage to the passing water in terms of the remaining amount of carbon dioxide.

Table 5

| Q cm³/min | S cm² | LV$_p$ cm/min | Remaining CO$_2$ | Blockage |
|---|---|---|---|---|
| 2000 | 78.5 | 26 | 50% – 60% | little |
| 8000 | 113.0 | 71 | 50% – 55% | '' |
| 8000 | 3.1 | 2550 | 45% – 50% | some |
| 100 | 1256.0 | 0.08 | 60% – 65% | very little |

Run 3

Non-carbonated water was fed into the dissolver at different linear velocities to determine an appropriate range of $LV_c$ in regard to the water hardness. The hardness increases with decreasing flow rate and the preferable value of the $LV_c$ is from 0.1 to 100 cm/min to provide appropriate hardness of up to 94 ppm.

Table 6

| Q cm³/min | S cm² | LV$_c$ cm/min | Hardness ppm | |
|---|---|---|---|---|
| | | | raw water | mineral water |
| 2000 | 78.5 | 26 | 40.0 | 90.0 |
| 8000 | 12.6 | 318 | 44.0 | 88.0 |
| 8000 | 3.1 | 2550 | 44.0 | 78.0 |
| 100 | 1256.0 | 0.08 | 38.0 | 94.0 |

In accordance with still another feature of the present invention, the dissolver 500 has dimensions that are preferable to obtain desired properties for the mineral water. Assume that the dissolver has a height H and a diameter D in its transversal cross-section, the ratio R is defined as H/D. When the cross section has a polygonal shape the ratio R is defined as a ratio between the height to the longest diagonal length.

EXPERIMENT III

Run 1

Non-carbonated water having a hardness of from 40 to 44 ppm, a pH value of 6.6 to 6.9 is fed through the mineral dissolvers of different diameters at a flow rate of 2.0 liter per minute, the dissolver containing calcium carbonate packed into a volume of 2000 cm³. The ratio R is preferably in the range from 0.1 to 100 by considering the results as shown in Tables 7 and 8.

Table 7

| H (cm) | D (cm) | R | Hardness ppm | Carbonate cm³ |
|---|---|---|---|---|
| 13 | 10 | 1.3 | 90.0 | 1000 |
| 160 | 4 | 40 | 90.0 | 2000 |
| 800 | 4 | 200 | 98.0 | 10000 |
| 0.84 | 12 | 0.07 | 70.0 | 100 |

Table 8

| H (cm) | D (cm) | R | Hardness ppm | Total acid ppm | Carbonate cm³ |
|---|---|---|---|---|---|
| 26 | 10 | 2.6 | 90.0 | 38.0 | 2000 |
| 160 | 4 | 40 | 92.0 | 30.0 | 2000 |
| 640 | 2 | 320 | 90.0 | 12.0 | 2000 |

Figure 6A:
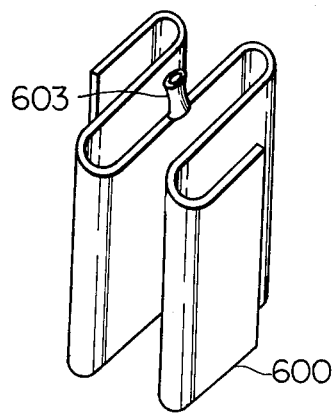
FIG. 6a is a perspective view of a filter assembly of the mineral dissolver of FIG. 5.
Figure 6B:
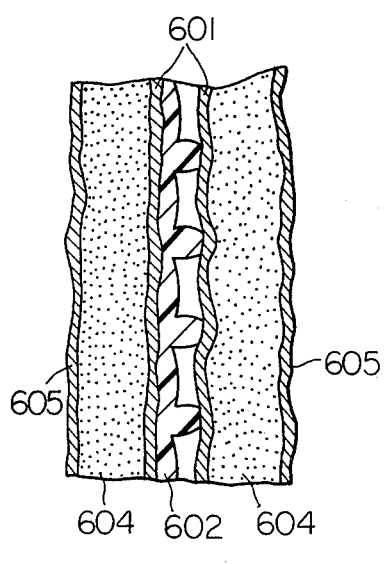

In accordance with another embodiment of the present invention, the filter assembly of the mineral dissolver 500 is provided with additional layers of filtering material to absorb colloidal minerals which might increase the turbidity of the mineral water. In FIG. 6a there is schematically shown a filter assembly in accordance with the present invention. The filter assembly is generally indicated at numeral 600 and has a meandering cross-sectional contour. The filter assembly comprises a pair of filter cloths or screens 601 in proximity thereto and a supporting member 602 (FIG. 6b) sandwiched therebetween. The supporting member may be of a conventional structure such as meshed structure to provide interspace between the filter cloths. The assembly further comprises a pipe 603 which extends downwardly into and between the filter cloths 601 to serve as a passage for delivery of filtered water to the outlet of the assembly. On the outer surfaces of the filter cloths there are applied layers 604 of porous particles such as, for example, activated carbon, anthracite or asbestos. A filter paper may also be used instead of such filtering particles. These layers 604 are sandwiched by a pair of filtering cloths 605 of the similar material as the filter cloths 601. Colloidal minerals will stick to the surfaces of the particles as they pass through the layers 604. After passing through the layer 601, the water fills the interspace between the layers 601 and led into the pipe 603 and delivered to the outlet as previously described.

Figure 6C:
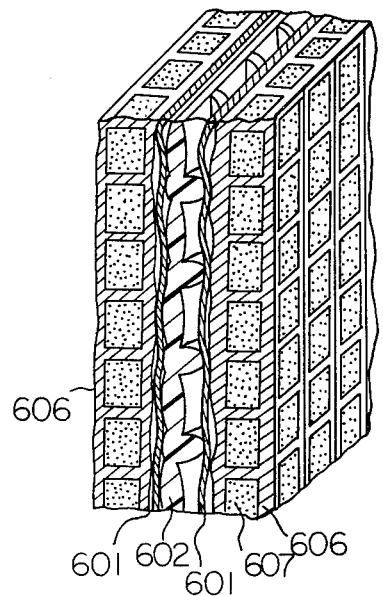

According to another form of the invention, the filter assembly 600 is provided with outer meshed structures to prevent sudden discharges of unsolved carbonate particles accumulated on the filter cloth. Without such an arrangement, frequent discharges of accumulated carbonate particles would pollute the mineral water to increase its turbidity. In FIG. 6c the filter assembly 600 comprises a pair of filter cloths 601 and a supporting member 602 sandwiched therebetween as previously described. The filter cloths 601 are provided with a pair of meshed structures 606 having a sufficient thickness to allow dissolved carbonate particles to be held up therein. Dissolved mineral particles 607 will be accumulating in the meshes of the structure 606 and allowed to grow to a thickness substantially equal to the thickness of the meshed structure 606. Since it takes a longer time for the particles to grow to that thickness than is otherwise provided, the discharge of accumulated particles to the outlet of the system and thus pollution of the mineral water obtained could be prevented for an extended period of time.

What is claimed is:

1. Apparatus for preparing mineral water, comprising a carbonator for dissolving carbon dioxide gas under pressure into water and a dissolver for dissolving at least one mineral carbonate soluble in acid but substantially insoluble in water, the carbonator having a mixing chamber, the feeding of water and carbon dioxide gas thereto and the discharge of carbonate water therefrom being governed by a single manually operable valve member, and means to adjust the the pressure of carbon dioxide gas to be fed to said mixing chamber at two stages so as to obtain a predetermined concentration of carbonated water under various pressures of water, said dissolver comprising a generally cylindrical body having a carbonated water inlet and a mineral water outlet adjacent one end and the opposite end of said body, respectively, a porous plate disposed in said body and spaced from said inlet a layer of said carbonate disposed between said porous plate and said outlet and a filter cloth assembly disposed between said layer and said outlet.

2. Apparatus as claimed in claim 1, wherein said carbonate is a powdered carbonate and said layer has a predetermined volume so that the space velocity SV of said carbonated water through said layer is below 50 min$^{-1}$.

3. Apparatus as claimed in claim 1, wherein said carbonate is a crushed carbonate and said layer has a predetermined volume so that the space velocity SV of said carbonated water through said layer is below 20 min$^{-1}$.

4. Apparatus as claimed in claim 1 wherein said carbonate is a granulated carbonate and said layer has a predetermined volume so that the space velocity SV of said carbonated water through said layer is below 50 min$^{-1}$.

5. Apparatus as claimed in claim 1 wherein said filter cloth assembly is arranged such that the linear velocity $LV_f$ of said carbonated water through said filter cloth assembly is between $1 \times 10^{-3}$ and $5 \times 10^2$ cm/min.

6. Apparatus as claimed in claim 1 wherein said carbonate is packed such that the linear velocity $LV_c$ of said carbonated water through said layer of carbonate is between $1 \times 10^{-3}$ and $5 \times 10 \times$ cm/min.

7. Apparatus as claimed in claim 1 wherein said porous plate is arranged such that the linear velocity $LV_p$ of said carbonated water through said porous plate is between $1 \times 10^{-3}$ and $5 \times 10^2$ cm/min.

8. An aerating device for producing carbonated water for use with a mineral water producing apparatus, comprising:

a body having a gas inlet adapted to receive gas from a source of gas under pressure, a gas outlet, a gas chamber providing communication between said gas inlet and said gas outlet and maintained at a controlled pressure lower than said gas pressure, a water inlet adapted to receive water from a source of water under pressure, a water outlet to deliver water to a mineral dissolving means, a water chamber providing communication between said water inlet and said water outlet and maintained at a controlled pressure lower than said water pressure, and a passageway providing communication between said water chamber and said gas outlet;

first spring responsive to the gas pressure in said gas chamber for changing the passage area of gas from said gas inlet into said gas chamber; and second spring responsive to water pressure in said water chamber for changing the volume of said water chamber and the passage area of gas from said gas outlet into said water chamber.

9. An aerating device as claimed in claim 8, wherein a movable valve member is slidably carried in said gas chamber for axial reciprocating movement with said first spring to change the passage area of gas into said gas chamber.

10. An aerating device as claimed in claim 8, wherein a movable valve member is slidably carried in said water chamber for axial reciprocating movement with said second spring to change the passage area of gas from said gas outlet into said water chamber and to maintain the water pressure in said water chamber at a constant level.

11. In apparatus for preparing mineral water, having a carbonator for preparing carbonated water and a mineral dissolver having a packed layer of at least one mineral carbonate soluble in acid and a filter assembly including a supporting meshed structure sandwiched between two layers of filter cloth and a pipe for discharging the filtered mineral water from a space between said two layers, the improvement comprising two layers of porous particles coated on the upstream side surfaces of said filter cloth and a second two layers of filter cloth covering said two layers of porous particles, said porous particles being selected from the group consisting of activated carbon, anthracite and asbestos.

12. In apparatus for preparing mineral water, having a carbonator for preparing carbonated water and a mineral dissolver having a packed layer of at least one mineral carbonate soluble in acid and a filter assembly including a supporting meshed structure sandwiched between two layers of filter cloth and a pipe for discharging the filtered mineral water from a space between said two layers, the improvement comprising meshed structures having a thickness sufficient to ensure against removal of mineral particles accumulated on said layers of filter cloth for an extended period of time.

* * * * *